United States Patent [19]
Petroff

[11] Patent Number: 5,391,878
[45] Date of Patent: Feb. 21, 1995

[54] MULTIPLEXED FIBER READOUT OF SCINTILLATOR ARRAYS

[75] Inventor: Michael D. Petroff, Fullerton, Calif.

[73] Assignee: Rockwell International Corporation, Seal Beach, Calif.

[21] Appl. No.: 146,869

[22] Filed: Nov. 3, 1993

[51] Int. Cl.⁶ ............................................. G01T 1/20
[52] U.S. Cl. .................................... 250/367; 250/366; 250/368
[58] Field of Search ........................ 250/368, 367, 366

[56] References Cited

U.S. PATENT DOCUMENTS

| | | | |
|---|---|---|---|
| 4,437,007 | 3/1984 | Koslow et al. | 250/366 |
| 5,103,099 | 4/1992 | Bourdinaud et al. | 250/368 |
| 5,138,165 | 8/1992 | Petroff | 250/363.03 |
| 5,281,820 | 1/1994 | Groh et al. | 250/368 |

*Primary Examiner*—Carolyn E. Fields
*Attorney, Agent, or Firm*—John C. McFarren

[57] ABSTRACT

A multiplexed optical fiber readout system is coupled to an array of scintillators, such as BGO crystals, for determining position and energy of radiation events in gamma ray imaging systems. Each scintillator in an N×M array is coupled to a pair of step-index-of-refraction, wavelength shifting, fluorescent fibers. The fluorescent fibers are arranged in N rows and M columns (or other indexed scheme) such that each scintillator is coupled to one row fiber and one column fiber, for example. The fluorescent fibers are coupled to clear optical fibers terminating at high quantum efficiency photon counters. Readout of the array of scintillators is accomplished by detecting coincident fluorescent photons in orthogonal pairs of the N+M fibers. By multiplexing the readout on row and column fibers, the number of signal channels is reduced by a factor of (N+M) / (N×M), which can greatly reduce cost or increase resolution compared with existing gamma ray imaging systems.

18 Claims, 2 Drawing Sheets

MULTIPLEXED FIBER READOUT OF SCINTILLATOR ARRAYS

TECHNICAL FIELD

The present invention relates to gamma ray imaging systems and, in particular, to an imaging system having a large array of scintillators coupled by multiplexed fluorescent fibers to high quantum efficiency photon counters for determining position and energy of received radiation.

BACKGROUND OF THE INVENTION

Gamma ray imaging systems have many applications in the field of non-destructive internal viewing of objects. In particular, medical imaging systems, such as computer aided tomography (CAT), positron emission tomography (PET), and single photon emission computer tomography (SPECT), often use an array of scintillation detectors for sensing radiation. Each time it absorbs gamma radiation, a scintillating detector, such as a crystal of BGO ($Bi_4GE_3O_{12}$), for example, emits light with intensity proportional to the energy of the absorbed gamma ray. The scintillating crystals of such detectors generally have diffuse reflecting coatings on all sides except for one bare face of each crystal that is in optical contact with a photomultiplier tube (PMT). Typical photon counting efficiency obtained for such systems using BGO crystals is about 10%, comprising the product of PMT photon collection efficiency of about 50% and PMT photo detection efficiency (QE) of about 20%.

Until recently, fiber optic collection of light from scintillating crystals used for gamma ray and X ray detection was considered too inefficient compared with direct collection by photomultiplier tubes (PMTs). U.S. Pat. No. 5,138,165 issued to Petroff describes a three-dimensional positron emission tomography system that uses an array of scintillating crystals in combination with solid state visible light photon counters (VLPCs). In this system, each scintillating crystal is coated with a layer of a diffuse reflector, such as MgO, except for a 1×1 mm² opening facing a VLPC. Although this system replaces PMTs with solid state VLPCs, one VLPC is required for each of the multiplicity of scintillating crystals in the detector array. Because fiber readout of large arrays of small scintillating crystals has been considered too costly due to the large number of VLPC channels required, there remains a need for medical imaging systems having large detector arrays that provide greater scanning volume, improved resolution, and lower patient radiation doses.

SUMMARY OF THE INVENTION

The present invention comprises a multiplexed optical fiber system coupled to a high density array of scintillators for detection and determination of position and energy of radiation events. The invention may be used in systems such as positron emission tomography (PET) for medical imaging, for example. Each scintillator in an N×M array of the present invention is coupled to a pair of step-index-of-refraction, wavelength shifting, fluorescent fibers. The fluorescent fibers are arranged in N rows and M columns such that each scintillator is coupled (typically on opposite sides of a scintillating crystal, for example) to one row fiber and one column fiber. The fluorescent fibers are coupled to clear optical fibers terminating at high quantum efficiency (QE) photon counters, such as visible light photon counters (VLPCs) that may be provided in a multichannel cassette/cryostat system. Readout of the array of scintillators is accomplished by detecting coincident fluorescent photons in orthogonal pairs of the N+M fibers. By multiplexing the readout on row and column fibers, the number of signal channels is reduced by a factor of (N+M) / (N×M), which can greatly reduce the cost (or increase the resolution through added scintillators) compared with existing medical imaging systems.

A principal object of the invention is the determination of position and energy of radiation events occurring in large arrays of scintillators. A feature of the invention is multiplexed fluorescent fibers coupled in rows and columns to an array of scintillators in a spectral detection and imaging system. Advantages of the invention are lower cost, greater resolution, and lower patient radiation doses in medical imaging systems.

BRIEF DESCRIPTION OF THE DRAWINGS

For a more complete understanding of the present invention and for further advantages thereof, the following Detailed Description of the Preferred Embodiment makes reference to the accompanying Drawings, in which.

DETAILED DESCRIPTION OF THE PREFERRED EMBODIMENT

The present invention comprises a multiplexed optical fiber system coupled to an array of scintillators for detection and determination of position and energy of radiation events. The invention may be used, for example, in medical imaging equipment such as the three dimensional positron emission tomography (PET) system described in U.S. Pat. No. 5,138,165, the teachings of which are hereby incorporated by reference. A schematic plan view of an array of scintillators 10 having a multiplexed fiber readout system of the present invention is illustrated in FIG. 1.

Figure 1A:
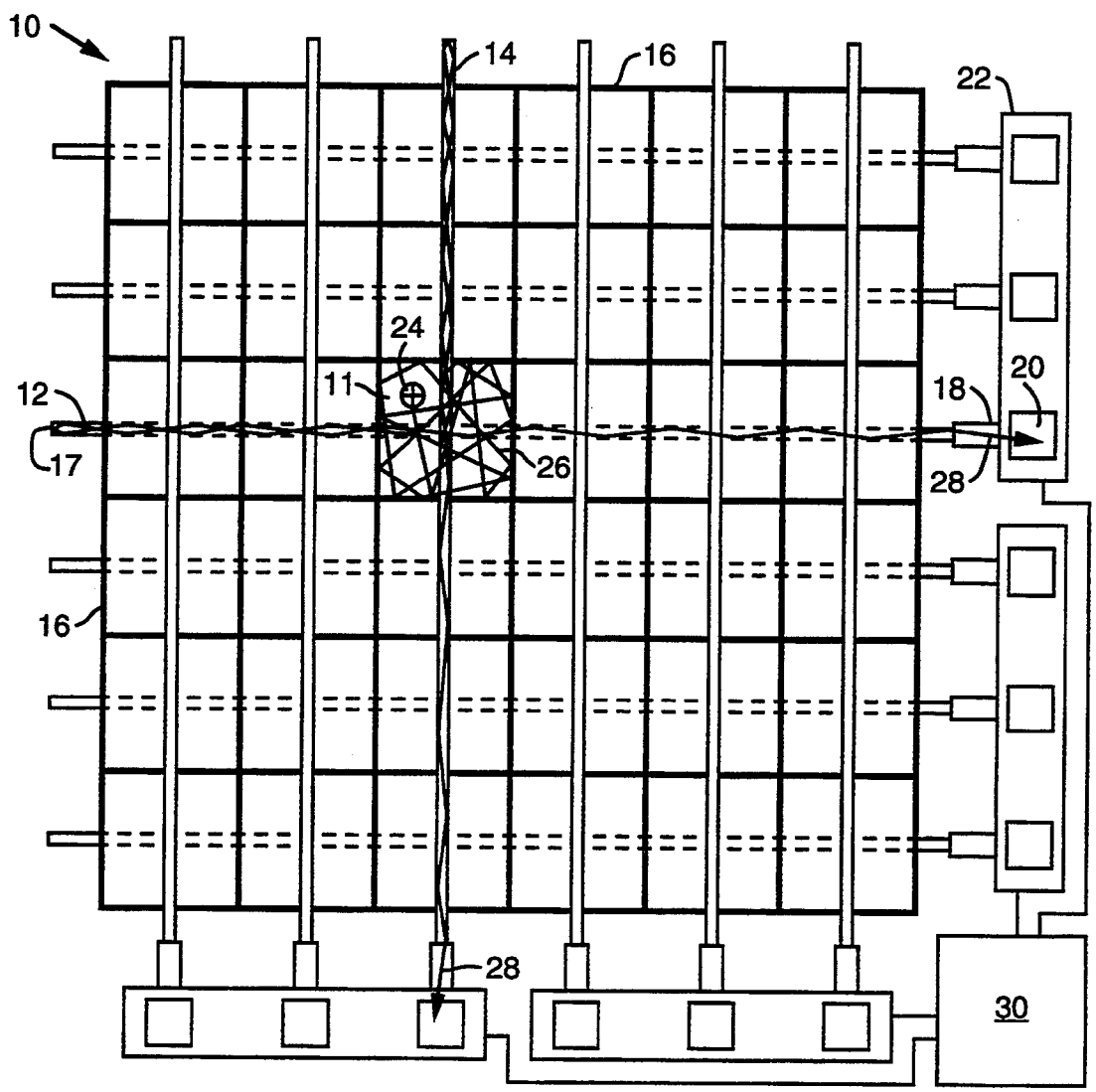
FIG. 1A is a schematic plan view of an array of scintillating crystals coupled to rows and columns of fluorescent fibers connected to photon counters.

In general, array 10 comprises an N×M array of scintillators, such as scintillating crystal 11, comprising a material such as $Bi_4GE_3O_{12}$ (BGO), for example. At the present time, BGO is the preferred scintillator for use in medical imaging systems. Each scintillating crystal of array 10 is coupled to a pair of step-index-of-refraction, wavelength shifting, fluorescent fibers. The fluorescent fibers are arranged in N rows and M columns such that each scintillating crystal is coupled to one row fiber and one column fiber. As illustrated in FIG. 1, all of the crystals in the row of crystal 11, for example, are coupled on their bottom surfaces to row fiber 12, and all of the crystals in the column of crystal 11 are coupled on their top surfaces to column fiber 14. Coupling of the fibers may be achieved with a small amount of optically clear material 15, such as silicone rubber or resin, for example, used to form an aperture from each crystal to the abutting side of the attached fiber. As illustrated in FIGS. 1A and B, the crystals may have square top and bottom faces and may be deeper than they are wide. The fluorescent fibers may have cross-sections that are circular (as illustrated) or rectangular, for example.

Array 10 with attached fluorescent fibers is coated with a thick layer of material, such as titanium oxide acrylic paint, for example, to provide a highly efficient diffuse reflecting surface 16 enveloping each crystal and fiber. Each fluorescent fiber in the rows and columns, such as row fiber 12, is connected to an optically clear waveguide fiber 18 having the same or slightly larger diameter. The opposite end of each fluorescent fiber is terminated in a reflecting surface 17 to direct all captured light into the clear fibers. Each clear fiber, such as fiber 18, is connected to a high quantum efficiency (QE) photon counter, such as a visible light photon counter (VLPC) 20. A multiplicity of VLPCs may be combined in a multichannel cassette 22, which is inserted into a cryostat (not shown). The output of the multichannel VLPC cassettes may be connected to a signal processor 30 for analyzing the light output of scintillating crystal array 10. Coincident detection of even a small number of photons in a row fiber and a column fiber identifies the particular scintillating crystal that experienced a gamma ray photon absorption event and the time of the event. The total number of fluorescent photons detected in both fibers coupled to the crystal during several scintillation lifetimes is a measure of the energy of the gamma ray photon. This also allows discrimination from background events having other energies.

As an example of the present invention, consider the use of a large array of BGO scintillating crystals (each approximately $4 \times 4 \times 10$ mm$^3$ in volume) in a positron emission tomography system. The scintillating crystals are exposed to 511 keV annihilation radiation gamma ray photons produced by the effect of a radioactive isotope administered to a medical patient. Absorption of the 511 keV gamma ray photons in a BGO crystal produces about 4 visible light photons per keV in the wavelength region of about 400 to 600 nm, with a peak of the spectrum at about 480 nm. Thus, each photoelectric gamma ray absorption event produces approximately 2000 photons in the 400 to 600 nm wavelength range. These photons are emitted from the short track of the 511 keV photoelectron (less than about 0.2 mm in range in BGO) in a time of about 1 $\mu$s (or about three BGO scintillation decay lifetimes of 0.3 $\mu$s).

Figure 1B:
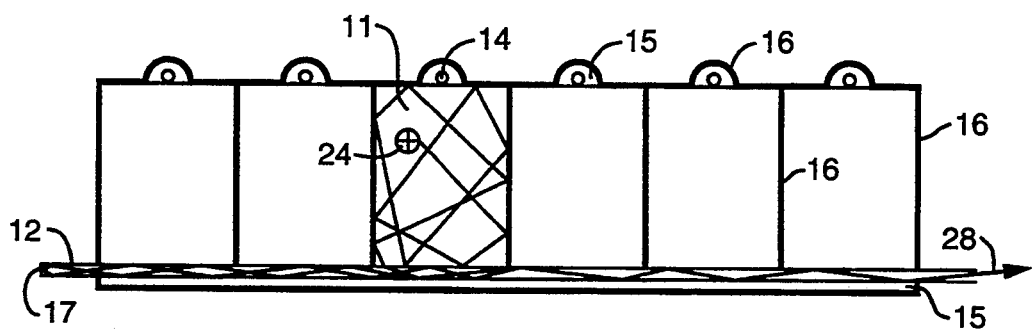
FIG. 1B is a schematic cross-section of a row of scintillating crystals of the array of FIG. 1.
Figure 2:
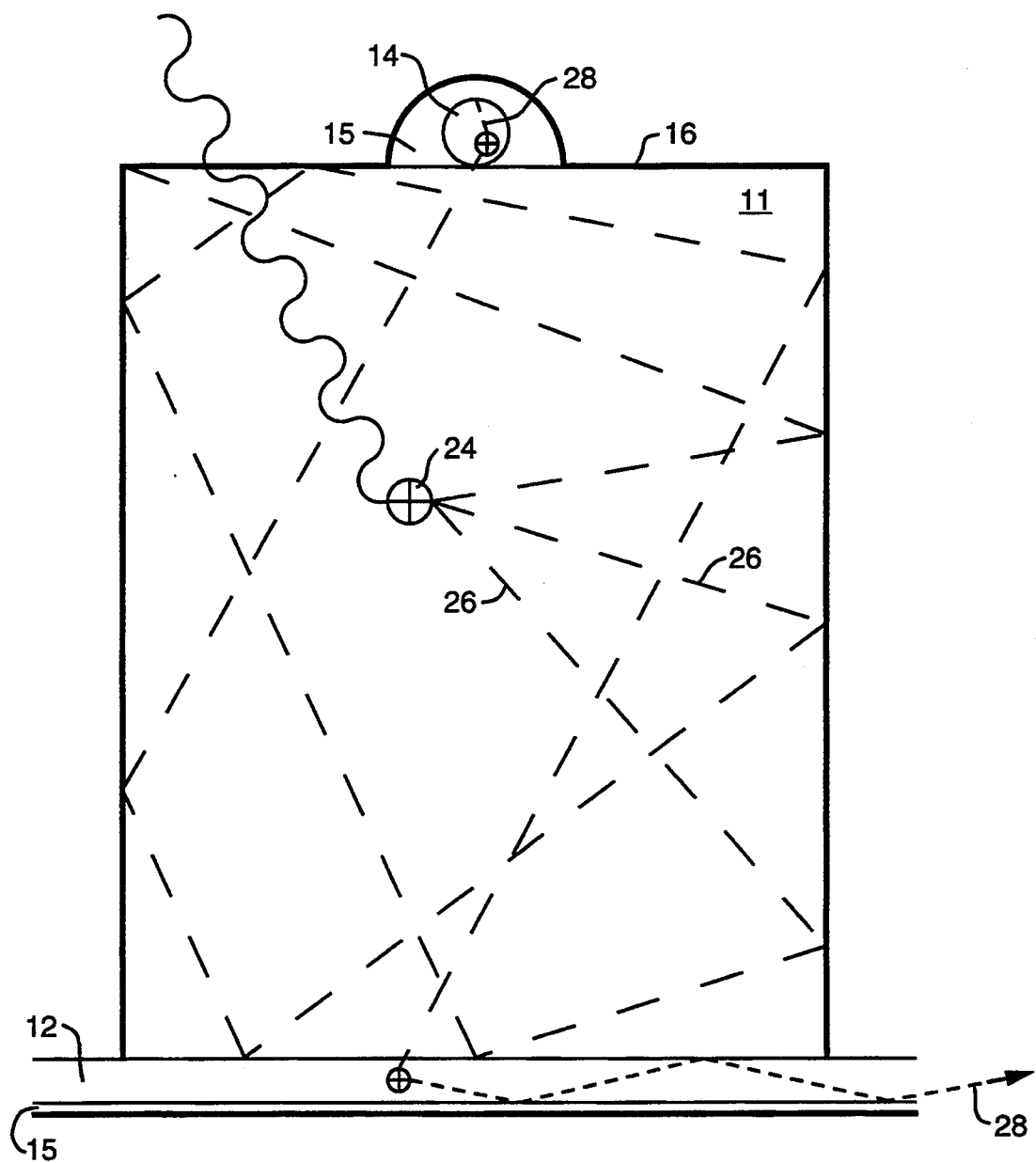
FIG. 2 is an enlarged cross-sectional view of one scintillating crystal of FIG. 1B.

FIGS. 1A and 1B show a gamma ray photon 24 absorbed in crystal 11 at row 3 and column 3 of array 10. Because of the clarity of BGO crystal 11 and the highly reflecting diffuse coating 16, the emitted visible light photons 26 remain trapped, reflected between the surfaces of the crystal, until they exit through the apertures to fluorescent fibers 12 and 14 coupled to crystal 11. The angular distribution of the photons is rendered isotropic, and photons with an angle of incidence within a cone of approximately 41 degrees about the normal at each point of the aperture to the fibers can pass through the cladding and enter the fluorescent fibers. This is based on calculating the angle of total internal reflection, given the index of refraction of the crystal (2.15, in this example) and the bonding resin (about 1.4, in this example).

Fluorescent fibers in the form of plastic, glass, or liquid filled glass capillaries are well known in the art. The fluorescent fibers include a fluorescent organic compound (or "fluor"), as is well known in the art of fluorescent materials, In the present invention, the particular fluorescent organic compound, its molar concentration, and its absorption (which should overlap the spectral emission of the scintillating crystal) are chosen so that photons entering the core of the fluorescent fiber are absorbed. The extinction length should be comparable to or less than the core diameter. Photons that are not absorbed on the first pass through the core may be absorbed after being reflected by the reflective coating 16 applied to the exterior of the assembly of crystals and fibers. With an appropriate fluor, the absorbed energy is re-emitted isotropically as photons 28 with a spectral distribution shifted sufficiently toward the red so that there is very little overlap with the absorption.

In fluorescent fibers 12 and 14, it is important to capture the emitted wavelength shifted light 28 within the angle of total internal reflection between the core and the fiber cladding. As an example, the index of refraction of a polystyrene fiber in the red part of the spectrum is 1.59, and the index of a fluorine polymer cladding is 1.40. With these materials, the fraction of the isotropically emitted wavelength shifted photons 28 captured in the fiber core and traveling in both directions is about 12%. Because of the total internal reflection of the fiber core/cladding interface, none of the photons 28 are lost to the crystals coupled to the fiber. With reflective surface 17 providing approximately 90% reflection at one end of fiber 12 (and all other row and column fibers), about 11% of the wavelength shifted photons 28 are directed to VLPC 20.

Of the approximately 2000 photons generated by typical BGO scintillating crystal 11 by the 511 keV gamma photon, only some fraction find their way into fluorescent fibers 12 and 14. This fraction depends on the diffuse reflectivity of the reflective coating 16, the clarity of the BGO crystal, the surface area of the crystal, the average path length of photons in the crystal, and the areas of the two apertures to fibers 12 and 14. For the ideal case of perfect diffuse reflection, no attenuation in the BGO crystals, and a perfect match between the emission spectrum of the BGO and the absorption spectrum of the fluor of the fibers, all scintillation photons produced in the crystals are absorbed in the fluorescent fibers. If there is only a small overlap between the absorption and emission spectra of the fluor, an estimated 10% of the wavelength shifted fluorescent photons are captured in the fibers and directed to the VLPCs. Thus, for each gamma ray absorption event in a crystal, about 200 photons will arrive at the VLPCs of the two channels coupled to the crystal. Detection efficiency of a VLPC optimized for the fluorescent photon spectrum is about 80%. Therefore, about 80 photons will be detected in each channel, which is more (for both channels together) than usually detected from BGO crystals (having a photon yield of 2000 per scintillation) by conventional state of the art photomultiplier tubes.

The foregoing approximations represent the minimum number of detected fluorescent photons transmitted by polystyrene fibers to the VLPCs. A higher percentage of fluorescent photons can be captured in glass fibers with a core having an index of refraction of 1.67 (about 16%) and in glass capillaries with a liquid core having an index of 1.75 (about 20%). The diffuse reflectivity of titanium oxide paint in a layer 16 about 0.25 mm thick has been measured at better than 99%. Therefore, the dominant loss of scintillation photons in clear BGO crystals is believed to be through escape into the coupled fibers to excite fluorescence.

The $6 \times 6$ array 10 illustrated in FIG. 1 is merely an example of a typically much larger $N \times M$ array of crystals. Readout of the array of scintillating crystals is accomplished by detecting coincident fluorescent photons in orthogonal pairs of the N+M fibers. By multiplexing the readout on row and column fibers, the number of signal channels is reduced by a factor of $(N+M) / (N \times M)$, which can greatly reduce the cost (or increase the resolution through added crystals) compared with existing medical imaging systems. For example, an array of 4096 separate BGO crystals (i.e., $2^6 \times 2^6$) can be read out by 128 VLPC channels (i.e., $2^6 + 2^6$) provided in four 32-channel VLPC cassettes. Greater resolution may be achieved using long BGO crystals (such as 0.5 cm $\times$ 0.5 cm $\times$ 2.5 cm long). Location of a scintillation in such a long crystal may be achieved by taking ratios of column and row signals (if the number of photons detected is large enough). For example, each long crystal may effectively comprise 5 lengthwise pixels. Considering a total of 100 detected photons, a row/column ratio of detected photons of 50/50 would imply a scintillation event near the middle of the crystal; a ratio of 80/20 would imply an event close to the row fiber end of the crystal; and a ratio of 40/60 would imply an event between the center and the column fiber end of the crystal.

The multiplexed fiber readout scheme described above has greatest advantage when N and M do not differ by a large factor. At the extreme, no reduction in readout channels would be achieved for a $1 \times M$ array of crystals. In the $1 \times M$ case, however, each of the M crystals can be labeled with two indexes (which may be thought of as corresponding to row and column indexes). Each crystal is connected to one of the first index (row) fibers and one of second index (column) fibers. An assembly of M crystals can be connected to approximately $M^{\frac{1}{2}}$ first index fibers and $M^{\frac{1}{2}}$ second index fibers to obtain the largest reduction in the total number of photon counter channels. This scheme requires inactive fiber lengths between crystals that may add to attenuation of the fluorescent photons before they enter the clear fibers 18 connected to the VLPCs. In most applications this should not cause a problem because the attenuation length of fluorescence in the fibers is expected to be about 2 to 4 meters.

Although the present invention has been described with respect to specific embodiments thereof, various changes and modifications can be carried out by those skilled in the art without departing from the scope of the invention. Therefore, it is intended that the present invention encompass such changes and modifications as fall within the scope of the appended claims.

I claim:

1. A multiplexed optical fiber system for readout of a plurality of scintillators forming an array, comprising:

a plurality of fluorescent fibers comprising first index fibers and second index fibers, each of said scintillators coupled to one of said first index fibers and one of said second index fibers;

a plurality of photon counters, each of said photon counters coupled to a corresponding one of said fluorescent fibers for detecting photons in said fiber generated by a radiation event in one of said scintillators coupled to said fiber; and means connected to said photon counters for detecting coincident photons generated in one of said first index fibers and one of said second index fibers, determining position of said radiation event in said array by identifying said one of said scintillators connected to said first and second index fibers generating said coincident photons, obtaining greater position resolution by measuring a ratio of said coincident photons generated in said one of said first index fibers versus said one of said second index fibers to determine position of said radiation event within said one of said scintillators, and determining energy of said radiation event by measuring total number of said coincident photons.

2. The system of claim 1, further comprising a plurality of clear optical fibers, each of said clear fibers connecting one of said fluorescent fibers to said corresponding photon counter.

3. The system of claim 1, further comprising a diffuse reflective coating enveloping each of said scintillators and coupled fluorescent fibers.

4. The system of claim 3, wherein said diffuse reflective coating comprises a layer of titanium oxide acrylic paint.

5. The system of claim 1, wherein said scintillators comprise $Bi_4GE_3O_{12}$ crystals.

6. The system of claim 1, wherein said fluorescent fibers include a fluorescent organic compound having an absorption spectrum overlapping with an emission spectrum of said scintillators and a fluorescent emission spectrum shifted away from said absorption spectrum.

7. A multiplexed fluorescent fiber readout system coupled to an array of scintillators, comprising:

a plurality of scintillators forming the array;

a plurality of fluorescent fibers comprising first index fibers and second index fibers, each of said scintillators coupled to one of said first index fibers and one of said second index fibers;

a diffuse reflective coating enveloping each of said scintillators and coupled fluorescent fibers;

a plurality of clear optical fibers, each of said clear fibers connected to an end of one of said fluorescent fibers;

a plurality of photon counters, each of said photon counters coupled to a corresponding one of said clear fibers for detecting photons generated in said fluorescent fiber by a gamma radiation event in one of said scintillators coupled to said fiber; and means connected to said photon counters for detecting coincident photons generated in one of said first index fibers and one of said second index fibers, determining position of said radiation event in said array by identifying said one of said scintillators connected to said first and second index fibers generating said coincident photons, obtaining greater position resolution by measuring a ratio of said coincident photons generated in said one of said first index fibers versus said one of said second index fibers to determine position of said radiation event within said one of said scintillators, and determining energy of said gamma radiation event by measuring total number of said coincident photons.

8. The system of claim 7, wherein said fluorescent fibers include a fluorescent organic compound having an absorption spectrum overlapping with an emission spectrum of said scintillators and a fluorescent emission spectrum shifted away from said absorption spectrum.

9. The system of claim 8, wherein each of said fluorescent fibers includes a reflective surface at an end opposite said end connected to said clear optical fiber.

10. The system of claim 9, wherein said scintillators comprise $Bi_4GE_3O_{12}$ crystals.

11. The system of claim 7, wherein said diffuse reflective coating comprises a layer of titanium oxide acrylic paint.

12. The system of claim 7, wherein said first index fibers comprise row fibers and said second index fibers comprise column fibers.

13. A multiplexed fluorescent fiber readout system coupled to an array of scintillating crystals, comprising:
   a plurality of scintillating crystals forming the array;
   a plurality of fluorescent fibers comprising row fibers and column fibers, each of said scintillating crystals coupled to one of said row fibers and one of said column fibers;
   a diffuse reflective coating enveloping each of said scintillating crystals and coupled fluorescent fibers;
   a plurality of clear optical fibers, each of said clear fibers connected to an end of one of said fluorescent fibers, each of said fluorescent fibers having a reflective surface at the end opposite said end connected to said clear optical fiber;
   a plurality of photon counters, each of said photon counters coupled to a corresponding one of said clear fibers for detecting photons generated in said fluorescent fiber by a gamma radiation event in one of said scintillating crystals coupled to said fiber; and
   means connected to said photon counters for detecting coincident photons generated in one of said row fibers and one of said column fibers, determining position of said radiation event in said array by identifying said one of said scintillators connected to said row and column fibers generating said coincident photons, obtaining greater position resolution by measuring a ratio of said coincident photons generated in said one of said row fibers versus said one of said column fibers to determine position of said radiation event within said one of said scintillators, and determining energy of said gamma radiation event by measuring total number of said coincident photons.

14. The system of claim 13, wherein said scintillating crystals comprise $Bi_4GE_3O_{12}$.

15. The system of claim 13, wherein said diffuse reflective coating comprises a layer of titanium oxide acrylic paint.

16. The system of claim 13, wherein said fluorescent fibers include a fluorescent organic compound having an absorption spectrum overlapping with an emission spectrum of said scintillating crystals and a fluorescent emission spectrum shifted away from said absorption spectrum.

17. The system of claim 13, wherein said photon counters comprise visible light photon counters.

18. The system of claim 13, wherein said array comprises an $N \times M$ array and said plurality of fluorescent fibers comprise N row fibers and M column fibers.

* * * * *